United States Patent

Kawabata et al.

Patent Number: 5,241,330
Date of Patent: Aug. 31, 1993

[54] BEAM RECORDING WITH SCANNING SPEED CHANGE DUE TO F.θ LENS CHARACTERISTICS

[75] Inventors: Motonobu Kawabata; Kenji Hiromatsu, both of Kyoto, Japan

[73] Assignee: Dainippon Screen Mfg. Co., Ltd., Japan

[21] Appl. No.: 769,299

[22] Filed: Oct. 1, 1991

[30] Foreign Application Priority Data

Oct. 2, 1990 [JP] Japan .................................. 2-265508
Oct. 2, 1990 [JP] Japan .................................. 2-265509

[51] Int. Cl.$^5$ .......................... H04N 1/21; B41J 2/435
[52] U.S. Cl. ...................................... 346/108; 346/1.1
[58] Field of Search ...................... 346/1.1, 76 L, 108, 346/107 R, 160

[56] References Cited

U.S. PATENT DOCUMENTS 4,717,925 1/1988 Shibata et al. ....................... 346/108
4,885,594 12/1989 Eguchi .................................. 346/108

Primary Examiner—Mark J. Reinhart
Attorney, Agent, or Firm—Ostrolenk, Faber, Gerb & Soffen

[57] ABSTRACT

An image recording apparatus modulates a laser beam based on an image signal and a reference clock, and then controls a polygon mirror to irradiate the laser beam on a surface of a photosensitive material. A reference clock generating circuit generates a reference clock having a frequency in proportion to a main scanning speed of a beam spot which is changed during each scanning due to a characteristic of an f·θ lens. The reference clock generating circuit includes a line memory which has a bit per address and stores a relationship between an incident angle θ of the laser beam on the f·θ lens and an image height of the whole valid scanning area, an address counter for designating the addresses serially at a fixed speed so that the data stored in the line memory can be read out address by address serially from a starting point to a finishing point of the valid scanning area, a waveform shaping circuit for generating a clock pulse from the bit data from the line memory, and a multiplying circuit for multiplying a frequency of the clock pulse by an integer of no less than 2.

26 Claims, 9 Drawing Sheets

F/V converter

Dot signal

Output from the multiplying section 104

Intensity of the laser beam LB from the AOM 2

Fig. 9a
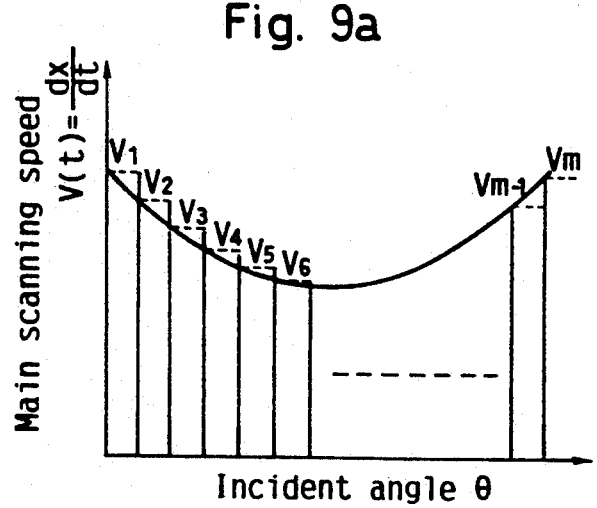
Fig. 9b
Fig. 9c
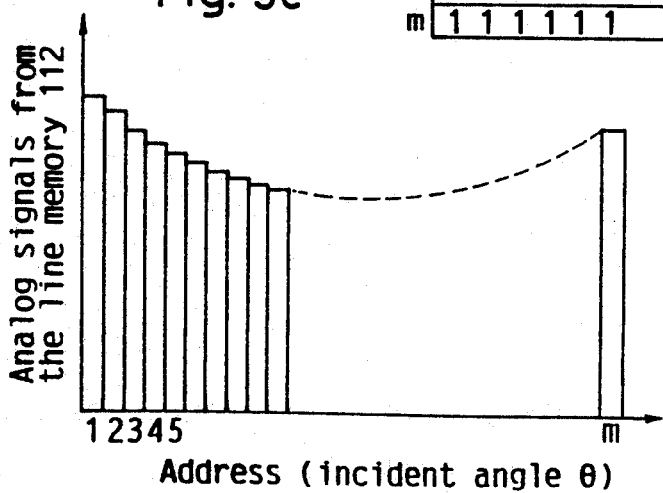

BEAM RECORDING WITH SCANNING SPEED CHANGE DUE TO F.θ LENS CHARACTERISTICS

BACKGROUND OF THE INVENTION

1. Field of the Invention

This invention relates to an image recording apparatus and method using a laser beam as a light source, especially to an image recording apparatus and method for improving a density uniformity of a recorded image in the main scanning direction.

2. Description of the Prior Art

In an image recording apparatus using a laser beam as a light source, a photosensitive material such as a film is scanned in the main scanning direction by use of a laser beam which is deflected in a one-dimensional direction by a polygon mirror or the like, while the photosensitive material is relatively moved in a sub scanning direction. In this way, a two dimensional scanning is done and an image data is recorded. The sub scanning direction is perpendicular to the main scanning direction.

Such an apparatus generally employs an f·θ lens for image focusing. A beam spot is formed on the photosensitive material by the f·θ lens, and then an image is recorded on the photosensitive material by a modulated laser beam. The modulation of the laser beam is done directly if the laser beam is emitted from a laser diode, or done by an AOM (acoustic-optical modulator) or the like if a gas laser beam is used.

The laser beam is modulated by an image signal in synchronization with a reference clock which is generated at a certain frequency each time the laser beam is detected by a sensor for detecting a scanning starting in the main scanning direction.

If an f·θ lens is used for image focusing and a deflector whose reflective surface is rotated at a fixed angular velocity such as a polygon mirror is used for scanning in the main scanning direction, the scanning speed at the beam spot is fixed owing to the f·θ characteristic of the lens. In other words, if an image is recorded on the photosensitive material in synchronization with a reference clock having a fixed frequency when the photosensitive material is on the image focusing surface, a uniform pixel density is obtained at any position in the main scanning direction. Accordingly, the obtained image has substantially no pixel density unevenness in the main scanning direction.

The above theory will be explained with reference to equations.

An incident angle θ of the laser beam on an f·θ lens has the following relationship with a height $x$ of the image.

$$x = f \cdot \theta \quad (1)$$

The above equation (1) is time-differentiated into:

$$dx/dt = f \cdot d\theta/dt \quad (2)$$

The left side of the equation (2) corresponds to a scanning speed of the laser beam on the image focusing surface, and $d\theta/dt$ of the right side thereof corresponds to an angular velocity of the polygon mirror (namely, the change of the above incident angle $\theta$ by the passage of time).

A fixed angular velocity of the polygon mirror means a fixed value of $d\theta/dt$ in an area where an image is recorded validly in the main scanning direction. (Such an area will be referred to simply as the valid area.) Accordingly, the scanning speed $dx/dt$ is fixed, resulting in an image having a uniform pixel density in the main scanning direction.

Today, a new f·θ lens is demanded which reduces a diameter of the beam spot and also increases a scanning angle. The reduced diameter of the beam spot raises a recording density, and the increased scanning angle enlarges the valid area.

An f·θ lens, which is produced especially to meet the above demands, is somewhat inferior in the above-mentioned advantageous f·θ characteristic. In other words, since the relationship expressed in the equation (1) is not fully obtained, the scanning speed at the beam spot cannot be fixed even if the angular velocity of the polygon mirror is fixed. The result is a recording density unevenness of the obtained image.

SUMMARY OF THE INVENTION

Accordingly, this invention has an object of offering an image recording method for recording an image having a uniform pixel density even if the scanning speed in the main scanning direction is changed during each scanning due to the f·θ lens produced with the f·θ characteristic being sacrificed.

Another object of this invention is to offer an image recording apparatus for carrying out the above method in a simple manner.

Still another object of this invention is to offer an image recording apparatus and method for recording an image having a uniform recording density even if an f·θ lens designed with the f·θ characteristic being sacrificed is employed.

In line with the above objects, this invention is characterized in that, in an image recording apparatus comprising a first scanning device for scanning the photosensitive material with a laser beam in a main scanning direction, an f·θ lens for focusing the laser beam to form a beam spot on a surface of the photosensitive material, and a second scanning device for relatively moving the photosensitive material in a sub scanning direction perpendicular to the main scanning direction, a frequency of a reference clock is controlled in proportion to a main scanning speed of the beam spot on the photosensitive material, the main scanning speed being changed during each scanning due to the f·θ lens produced with the f·θ characteristic being sacrificed, and further in that the laser beam is modulated based on an image data and the reference clock before the photosensitive material is scanned by the first scanning device.

According to the above control, a main scanning pitch, which is obtained by dividing the main scanning speed by the frequency of the reference clock, is fixed. Even if the f·θ lens has a large scanning angle but somewhat inferior f·θ lens characteristic, a highly precise image with a uniform pixel density is obtained.

The frequency controlling device may comprise a line memory for storing a relationship between an incident angle of the laser beam on the f·θ lens and an image height as a bit data concerning at least a valid scanning area, the line memory having a bit per address; an address designating device for designating the addresses serially at a fixed speed so that the data stored in the line memory can be read out address by address serially from a starting point to a finishing point of the valid scanning area; and a waveform shaping device for shaping the data from the line memory into a clock pulse.

The frequency controlling device may further comprise a multiplying device for multiplying the clock pulse by a specified number.

The frequency controlling device may comprise a line memory for storing a value which indicates the main scanning speed on an image focusing plane of the f·θ lens as an n-bit data, the line memory having one address per n-bit data for each specified incident angle; an address counter for designating the addresses serially at a fixed speed so that the data stored in the line memory can be read out address by address serially from a starting point to a finishing point of the valid scanning area; and a reference clock generating circuit for generating the reference clock having a frequency which is in proportion to the n-bit data from the line memory.

The reference clock generating circuit may comprise a D/A converter for converting the n-bit data into an analog signal; and a voltage-controlled oscillator for converting the analog signal into the reference clock having the frequency which is in proportion to the analog signal.

The image recording apparatus may further comprise a detecting device for detecting a scanning start position of the laser beam; and a resetting device for resetting and controlling the address designating device to designate the addresses when the detecting device detects the scanning start position.

The laser beam modulating device may modulate the laser beam generated by a laser beam source and comprise a dot signal generator for converting the image signal into a dot signal by use of the reference clock; a driver for amplitude-modulating the dot signal by use of a carrier wave having a high frequency; and an acoustic-optical modulator for on/off-modulating the laser beam by use of an output of the driver.

The laser modulating device may include a laser beam source for generating the laser beam.

The first scanning device may be a polygon mirror.

The image recording apparatus may further comprise a light intensity signal generating device for generating a light intensity signal which is in proportion to the frequency of the reference clock; and an intensity modulating device for modulating the dot signal by use of the light intensity signal, the dot signal being at a position corresponding to the reference clock in the main scanning direction.

The light intensity signal generating device may be a frequency/voltage converter for converting the frequency of the reference clock into an analog signal indicating a voltage corresponding to the frequency of the reference clock, and the intensity modulating device may be a multiplier for multiplying the analog signal by the dot signal, the multiplier being provided between the dot signal generator and the driver.

In the above construction, the intensity of the laser beam is changed in accordance with the main scanning speed of the beam spot on the photosensitive material. Consequently, the amount of the energy irradiated by the laser beam on a unit surface area is fixed, thereby substantially eliminating the recording density unevenness.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIGS. 9a through 9c are views showing how to store data to a line memory of the third embodiment and contents thereof.

DESCRIPTION OF THE PREFERRED EMBODIMENTS

Figure 1:
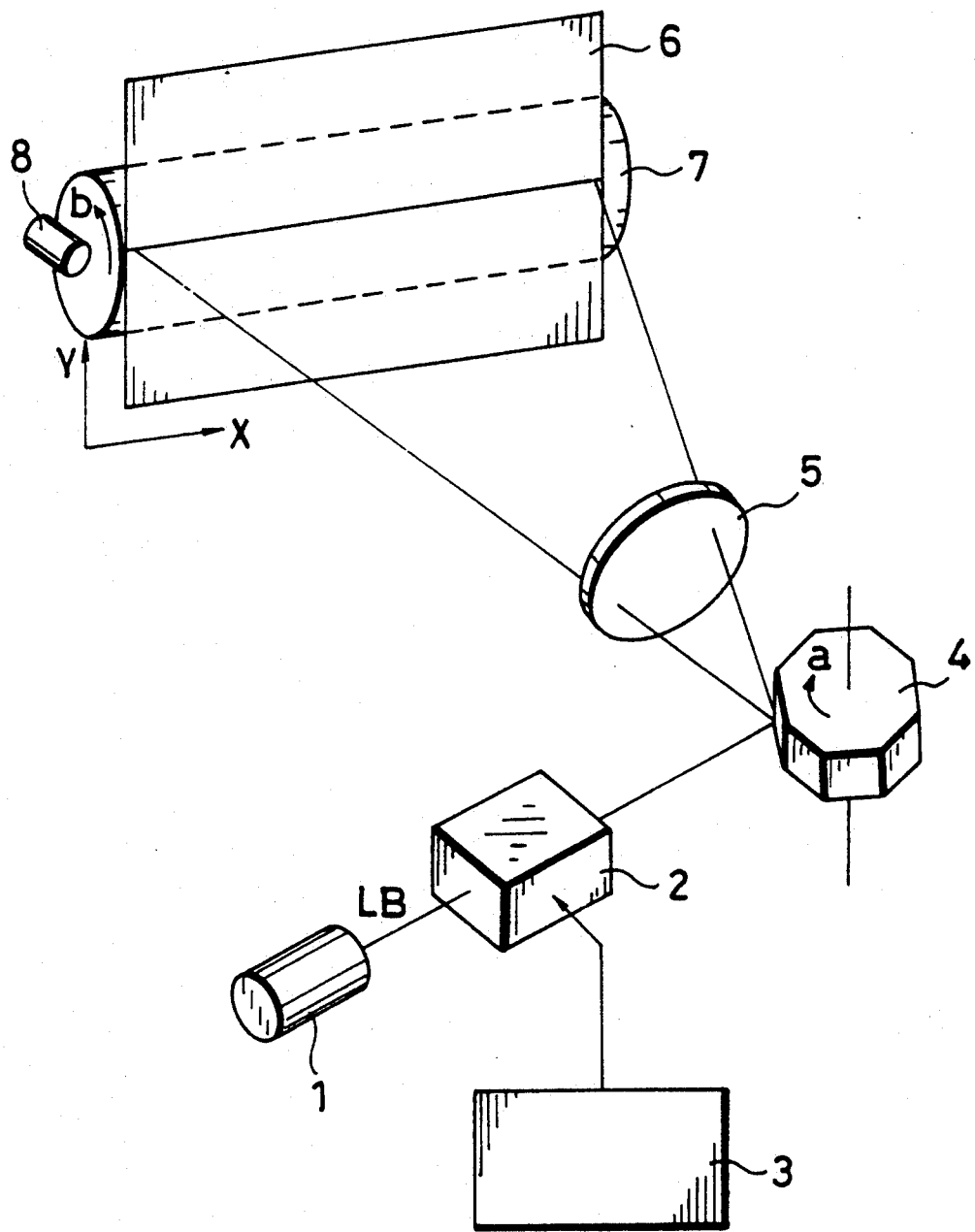
FIG. 1 is a view showing an overall construction of a first embodiment according to this invention.

FIG. 1 shows an overall construction of a scanner for preprinting as a first embodiment according to this invention.

The scanner is equipped with a polygon mirror as a first scanning device. X and Y in FIG. 1 show a main scanning direction and a sub scanning direction, respectively.

In the scanner for preprinting, an image signal is generally outputted after being dot-modulated, in line with which this and the following embodiments will be described. It should be noted, however, this invention is applicable for an image recording apparatus for outputting continuous tone signals.

The scanner of FIG. 1 is constructed and operated as follows.

When a laser beam LB from a laser beam source 1 is incident on an AOM 2, the AOM 2 on/off-modulates the laser beam LB in accordance with a dot signal sent from a dot signal generator 3. The laser beam LB is then incident on a mirror surface of a polygon mirror 4 rotated at a fixed speed in a direction of a. The laser beam LB reflected on the mirror surface is periodically deflected in the X direction in accompaniment with the rotation of the polygon mirror 4. The deflected laser beam LB passes through an f·θ lens 5 and is focused in the form of a beam spot on a photosensitive material 6 provided on an image focusing plane. The photosensitive material 6 is adhered on a drum 7 rotating in a direction of b as a second scanning device. The laser beam LB records a two-dimensional image on a surface of the photosensitive material 6 owing to the rotations of the polygon mirror 4 and the drum 7.

A start sensor 8 for detecting a scanning start position of the laser beam LB in the X direction is provided in the vicinity of a side surface of the drum 7, the side surface being close to the scanning start position.

Figure 2A:
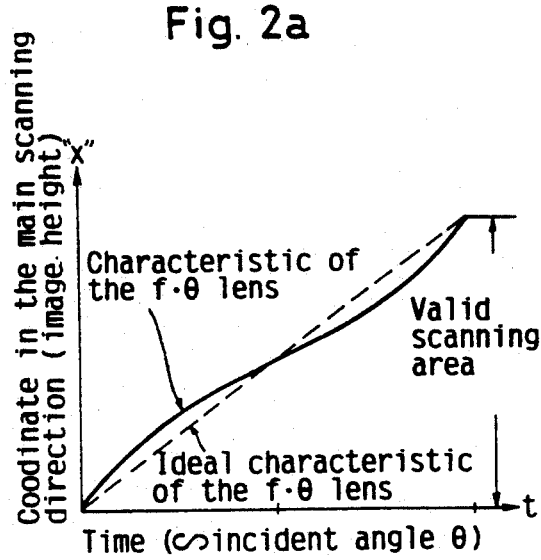
FIGS. 2a through 2e are graphs explaining why a main scanning pitch on a photosensitive material can be fixed by use of an f·θ lens which is produced with the f·θ characteristic being sacrificed to a certain extent.

The f·θ lens 5 is designed with the f·θ characteristic sacrificed to a certain extent, so as to shorten a diameter of the beam spot and also to enlarge a scanning angle. The shorter diameter realizes a more precise image and the larger scanning angle realizes a larger valid area for scanning. Consequently, the relationship between an incident angle θ of the laser beam LB on the f·θ lens 5 and an image height x is as shown with a solid line in FIG. 2a, but an ideal relationship shown with a dashed line is not obtained.

Where the beam spot made by the f·θ lens 5 is detected by the start sensor 8 at a time t=0 and the incident angle θ at that time is θ=0, the angle θ and the time t correspond to each other exactly one to one. That is why the horizontal axis of FIG. 2a is expressed with t. The vertical axis is expressed with a coordinate "x" of the main scanning direction X because the image height x is the same as the coordinate "x" where the start sensor 8 is positioned at an origin.

Figure 2C:
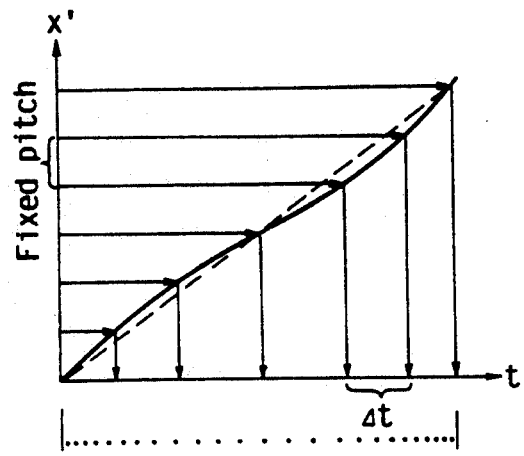
Figure 2B:
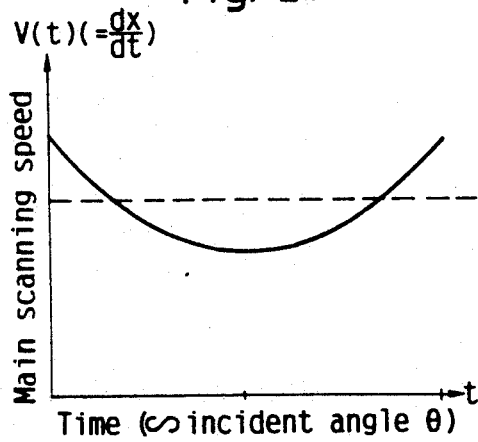

Since the above relationship between the incident angle θ and the image height x is not linear, the main scanning speed V(t)(=dx/dt) at the beam spot on the photosensitive material 6 changes as time passes as shown in FIG. 2b.

Where a frequency of a reference clock given to the AOM 2 is fd(t) and a main scanning pitch recorded on the photosensitive material 6 by the laser beam LB which is on/off-modulated by the AOM is $\Delta P(t)$, $$\Delta P(t) = K_1 \cdot V(t)/fd(t) \quad (3)$$

($K_1$: constant)

Figure 2D:
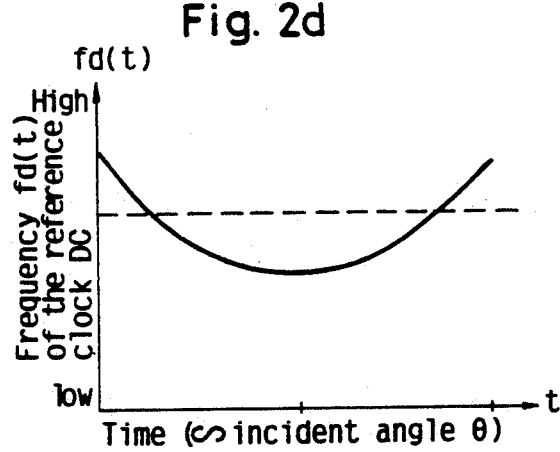

Since the main scanning speed V(t) is changed by the passage of time, the main scanning pitch $\Delta P(t)$ is only fixed by changing the frequency fd(t) in proportion to the main scanning speed V(t) as shown in FIG. 2d.

Figure 3:
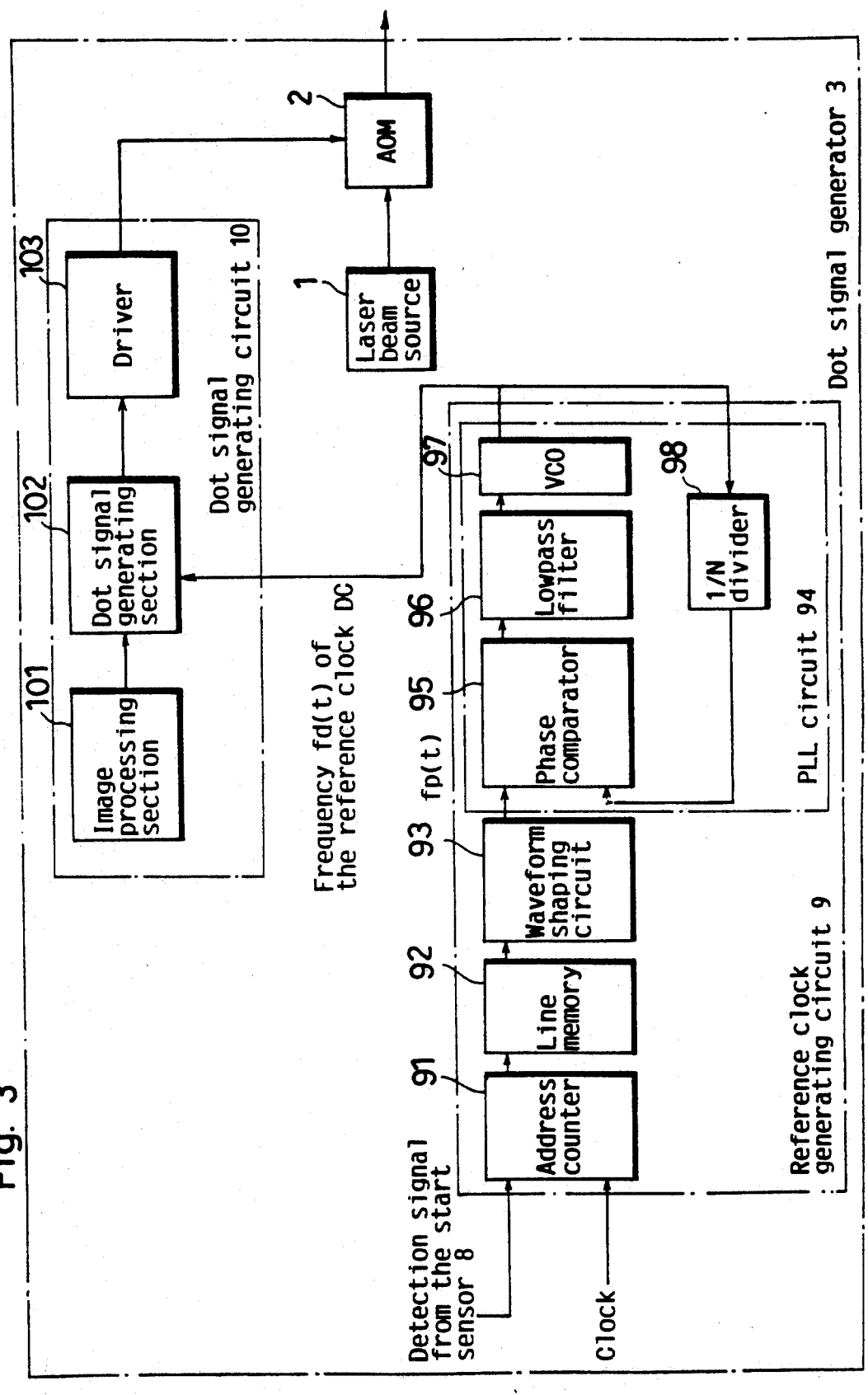
FIG. 3 is a block diagram of a dot signal generator of the first embodiment.

The dot signal generator 3 includes circuits for fulfilling such a condition. As shown in FIG. 3, the generator 3 comprises a reference clock generating circuit 9 and a dot signal generating circuit 10. The reference clock generating circuit 9 comprises an address counter 91, a line memory 92, a waveform shaping circuit 93 and a PLL (phase locked loop) circuit 94.

The address counter 91 receives and counts clock pulses having a fixed frequency outputted from a clock generator (not shown), the counting starting when the counter 91 receives a detection signal from the start sensor 8. The counted value is outputted as an address designating signal to the line memory 92. The above clock pulses may be generated by a rotary encoder coaxially attached to the polygon mirror 4 or may be generated more simply by a source having an isochronism such as a crystal oscillator. Due to the rotation of the polygon mirror 4 at a fixed angular velocity, the above counted value is in proportion to the incident angle θ. The address counter 91 stops counting when the counted value equals a number of words stored in the line memory 92. When the detection signal is inputted from the start sensor 8 again, the address counter 91 is reset and start counting again.

Figure 4:
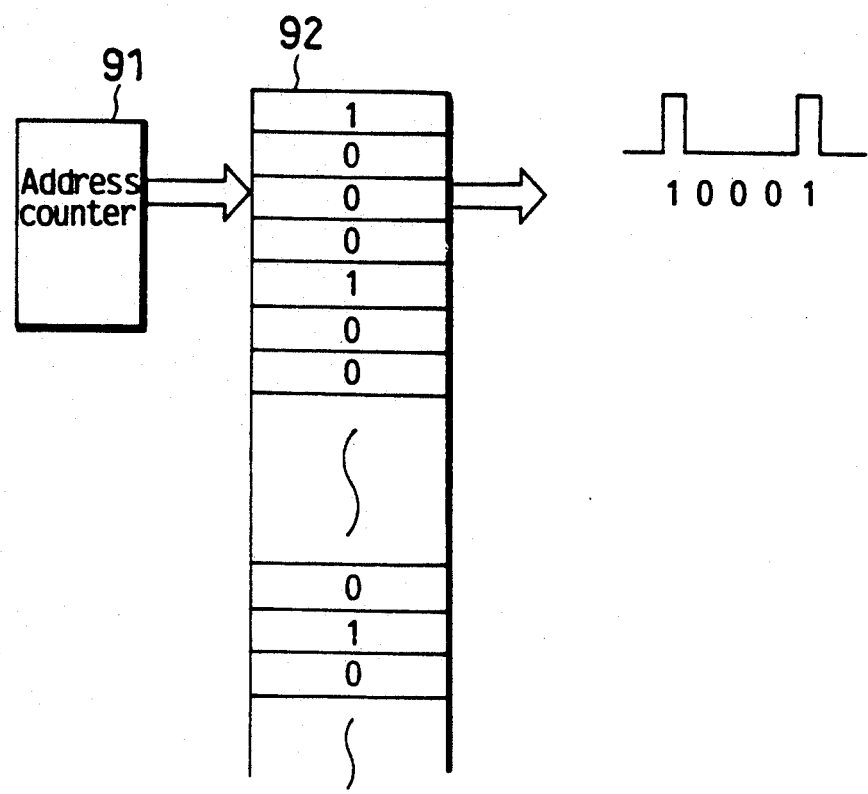
FIG. 4 is a view showing contents of a line memory.

The line memory 92, which has a certain memory capacity with 1 binary bit per word, stores the relationship between the incident angle θ and the image height x. The incident angle θ and the image height x are both measured and stored in the following way. A scale having marks x' at a fixed pitch is placed on the image focusing plane, and the incident angle θ of the laser beam LB on the f·θ lens 5 which has just been produced is changed on the basis of a unit incident angle. If the beam spot is on any of the marks x', "1" is stored, whereas if the beam spot is on none of the marks x', "0" is stored. Each address (namely, each word) of the line memory 92 corresponds to the unit incident angle. FIG. 4 shows the data stored in the line memory 92. FIG. 2c shows the relationship between the above fixed pitch and a time t required for the beam spot to go form one mark to the next.

The waveform shaping circuit 93 is a known circuit for shaping a waveform of a pulse read out from the line memory 92.

The PLL circuit 94, which is also known, comprises a phase comparator 95, a lowpass filter 96, and a VCO (voltage-controlled oscillator) 97 and a 1/N divider 98. A reference clock DC, which is obtained by multiplying a frequency of the pulse sent from the line memory 92 by N (N: integer), is outputted from the VCO 97.

The dot signal generating circuit 10 comprises an image processing section 101, a dot signal generating section 102 and a driver 103. The image processing section 101 is known and mainly modifies an image signal in terms of gradation and color. The dot signal generating section 102 converts an image data obtained by the section 101 into a binary code as a dot signal by use of the reference clock DC obtained by the reference clock generating circuit 9. The driver 103 amplitude-modulates the dot signal obtained by the section 102 by use of a high frequency signal (for example, a carrier wave of 80 MHz). The signal modulated by the driver 103 is added to the AOM 2, whereby the laser beam LB is on/off-modulated. A frequency for the on/off-modulation equals the frequency fd(t) of the reference clock DC.

A one-line image is practically scanned as follows from a left point to a right point of the photosensitive material 6.

Figure 5:
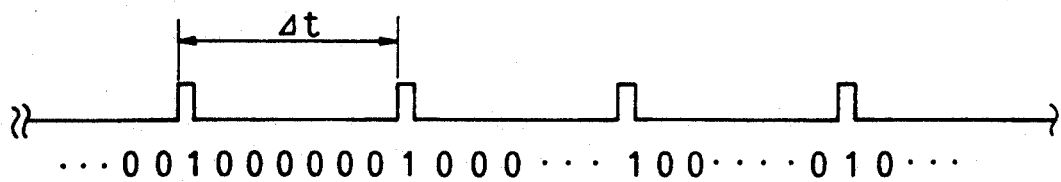
FIG. 5 is a view showing a pulse waveform from the line memory.

When the beam spot is detected at the scanning start position by the start sensor 8, the address counter 91 of the reference clock generating circuit 9 is reset and starts counting the clock pulses having the fixed frequency. The counted value of the address counter 91 is sent to the line memory 92 as an address designating signal, whereby the data stored in the line memory 92 is read out word by word as a pulse (original reference clock) shown in FIG. 5. In FIG. 5, the pulse gets "high" when the data in the line memory 92 is "1" and gets "low" when the data is "0". Since the line memory 92 holds the relationship between the incident angle θ and the image height x, both measured, a pulse width $\Delta t$ (FIG. 2c) is a time required for the beam spot to move a fixed fine distance on the photosensitive material 6. The above time is in proportion to an inverse of the main scanning speed V(t). In other words, $$\Delta t \propto 1/V(t) \quad (4)$$

Since the pulse width $\Delta t$ is equal to an inverse of a frequency fp(t) of the pulse from the line memory 92, the frequency fp(t) and the main scanning speed V(t) are related to each other as:

$$fp(t) \propto V(t) \quad (5)$$

$$\text{or } fp(t) = K_2 \cdot V(t) \quad (5)'$$

($K_2$: constant)

Since the pulse from the line memory 92 is multiplied by N by the PLL circuit 94 and used as the reference clock DC, the frequency fd(t) of the reference clock DC and the frequency fp(t) of the pulse from the line memory 92 have the relationship expressed by:

$$fd(t) = N \cdot fp(t) \quad (6)$$

Obtained by substituting the equation (5)' into the equation (6) is $$fd(t) = N \cdot K_2 \cdot V(t) \quad (7)$$

Since the above-obtained frequency fd(t) (FIG. 2d) is used to on/off-modulate the laser beam LB, the main scanning pitch ∆(t) is obtained by substituting the equation (7) into the equation (3). Namely, $$\Delta P(t) = K_1/(K_2 \cdot N) \quad (8)$$

Figure 2E:
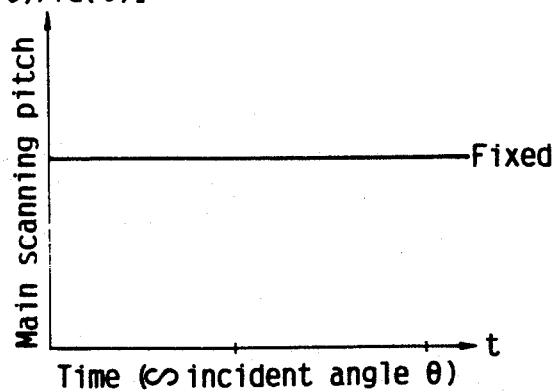

Since $K_1$, $K_2$ and N are all constants, the main scanning pitch ∆P(t) is a constant which is independent of time. That is, even if the f·θ lens 5 produced with the f·θ characteristic being sacrificed to a certain extent is employed, the main scanning pitch ∆P(t) can be maintained at a certain level and thus the image is recorded with a uniform pixel density. FIG. 2e shows the relationship of the equation (8). Although FIG. 2e shows the above relationship from the viewpoint that the main scanning pitch ∆P(t) is in proportion to a value obtained by dividing the main scanning speed V(t) by the frequency fd(t) of the reference clock DC, FIG. 2e has the same physical meaning with the equation (8).

Figure 6:
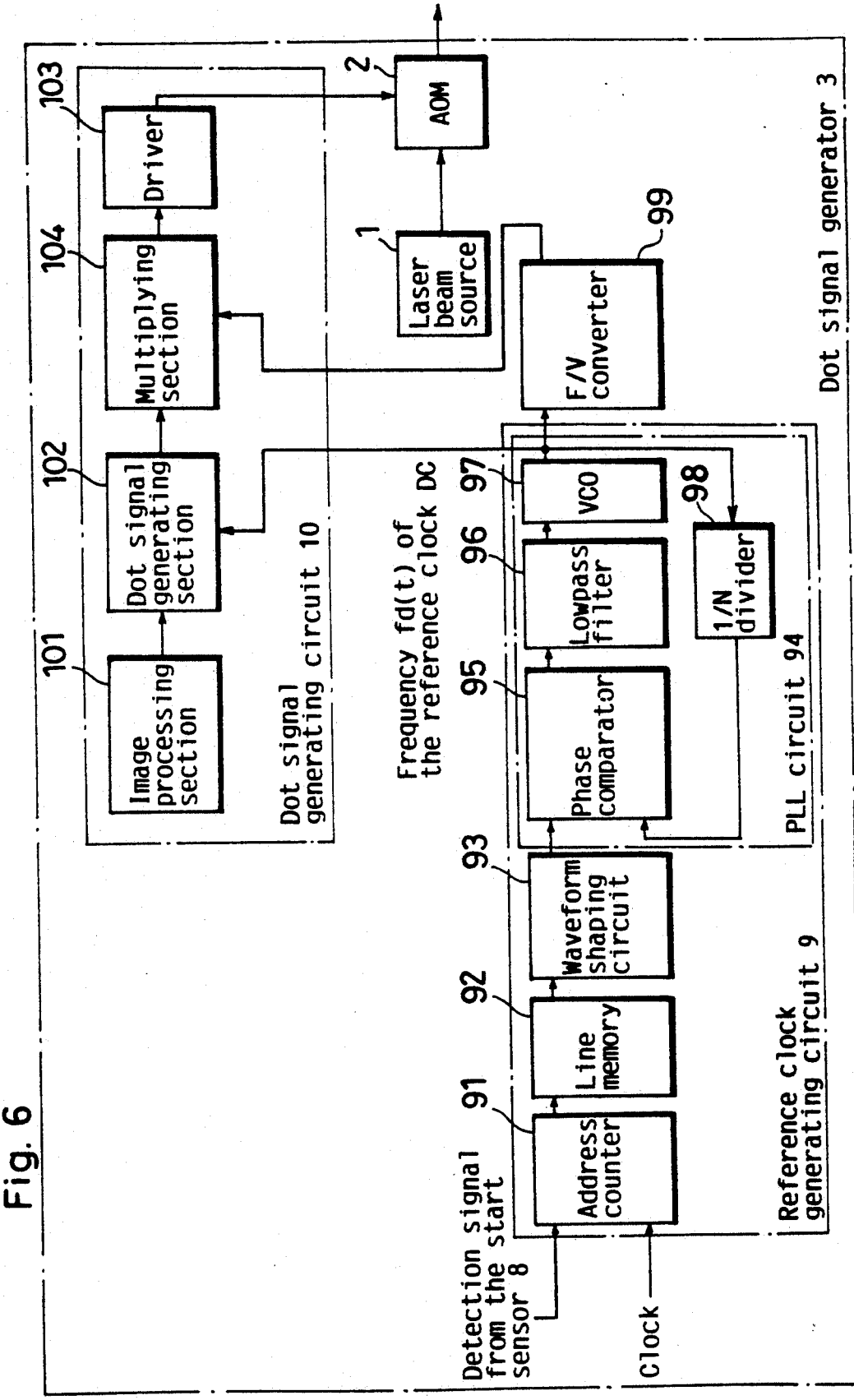
FIG. 6 is a block diagram of a second embodiment according to this invention.

FIG. 6 is a block diagram of a second embodiment of this invention.

In the first embodiment, the main scanning pitch ∆P(t) can be maintained at a certain level even if the main scanning speed V(t) changes but the image cannot be recorded with a uniform density even with a power of the laser beam source 1 being fixed. Where the main scanning speed V(t) is extremely high, the recording density is low due to a small amount of energy irradiated toward a unit surface area, whereas where the main scanning speed V(t) is extremely low, the recording density is high due to a large amount of such energy.

The second embodiment is devised in order to solve the above problem.

The dot signal generating circuit 10 comprises multiplying section 104 between the dot signal generating section 102 and the driver 103 in addition to the elements mentioned in the first embodiment. Further, the VCO 97 of the reference clock generating circuit 9 is connected to a frequency/voltage converter 99. In this construction, a signal from the converter 99 is added to the multiplying section 104 as described hereinafter.

Figure 7A:
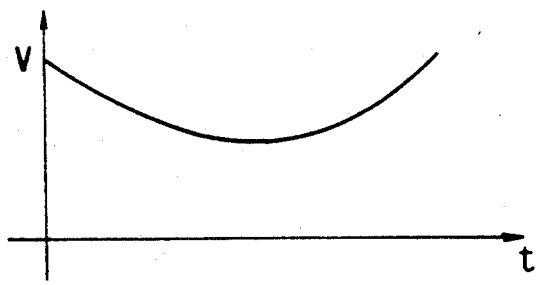
FIGS. 7a through 7d are views showing outputs from various sections of FIG. 6.
Figure 7B:
Figure 7C:
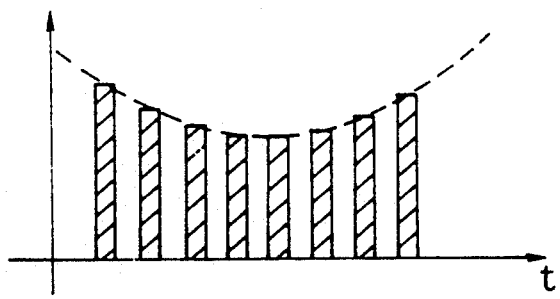
Figure 7D:
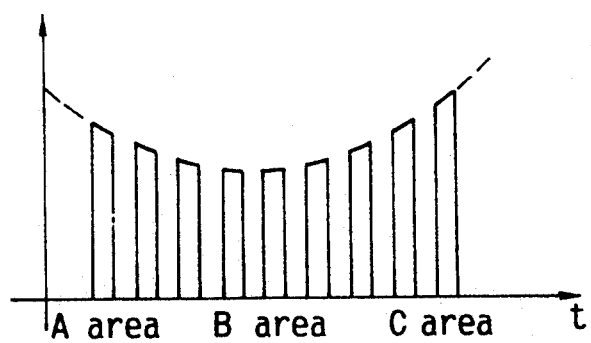

The frequency fd(t) of the reference clock DC obtained by the VCO 97 is in proportion to the main scanning speed V(t) as indicated by the equation (7). Accordingly, the frequency/voltage converter 99 outputs a signal as shown in FIG. 7a, which is similar to the waveform of the main scanning speed V(t) (FIG. 2b). Since the dot signal generating section 102 dot-modulates the image signal obtained by the image processing section 101 each time the section 102 receives the reference clock DC. A dot signal from the section 102, exemplified in FIG. 2b, usually gets on and off alternately on a basis of several to nearly 100 clocks. In FIG. 7b, the image signal and the frequency fd(t) of the reference clock DC are fixed for easier explanation. The multiplying section 104 multiplies the dot signal from the section 102 by the signal from the converter 99 and thus outputs a signal as shown in FIG. 7c. The signal from the multiplying section 104 is modulated by the driver 103 by use of a high frequency signal and added to the AOM 2, whereby the AOM 2 on/off-modulates the laser beam LB as shown in FIG. 7d. As apparent from FIG. 7d, the laser beam LB from the AOM 2 is strong where the main scanning speed V(t) is high (A and C areas) whereas the laser beam LB is weak where the main scanning speed V(t) is low (B area). As mentioned before, the amount of energy is small where the main scanning speed V(t) is high, and is large where the main scanning speed V(t) is low, if the power of the laser beam LB is fixed. Owing to the combination of the change in the energy amount and the change in laser beam intensity from the AOM 2, the energy can be fixed through the whole photosensitive material 6, resulting in an image of a uniform recording density.

Figure 8:
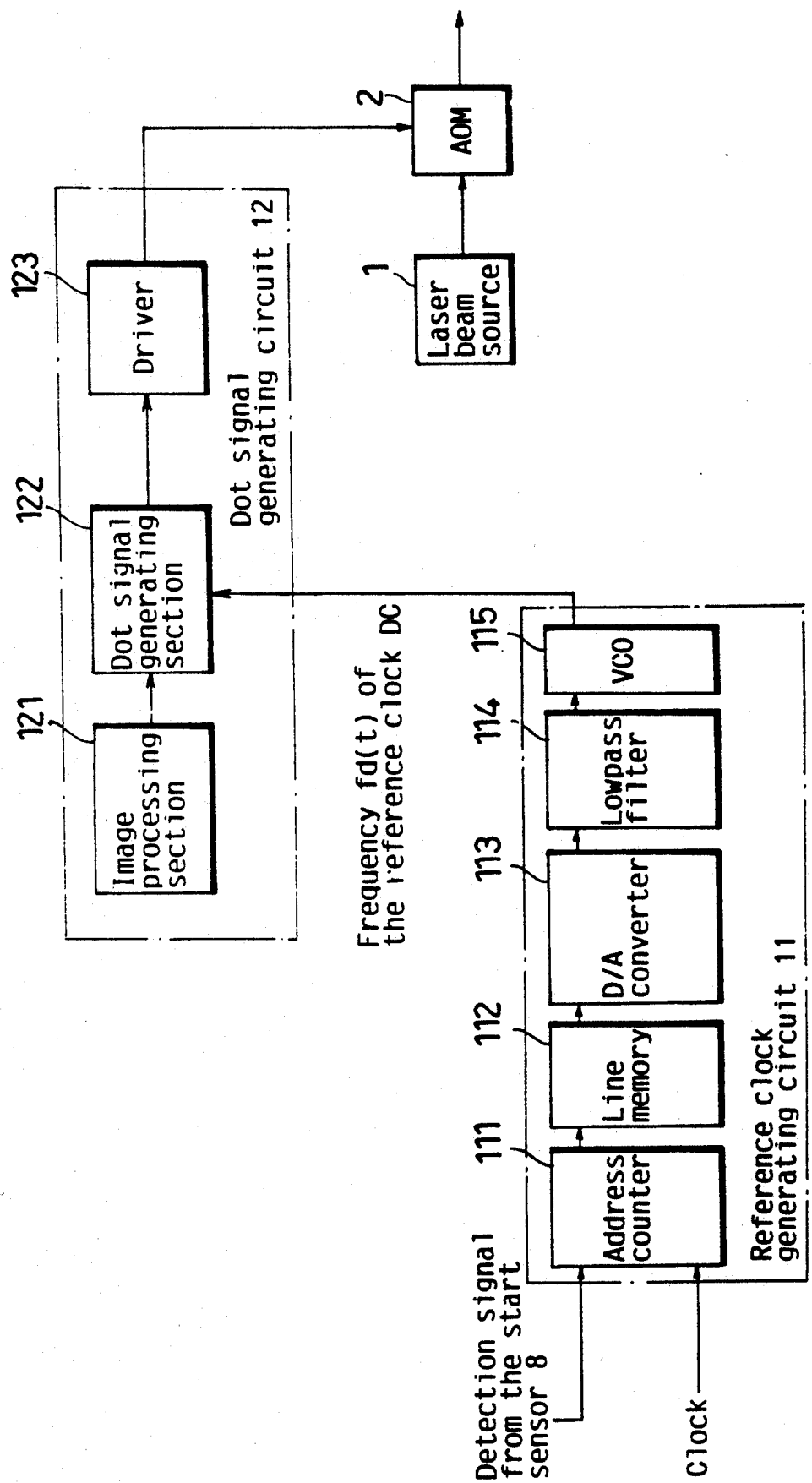
FIG. 8 is a block diagram of a third embodiment according to this invention.

FIG. 8 is block diagram of a third embodiment. The third embodiment is distinct from the first embodiment in that a reference clock generating circuit 11 and a dot signal generating circuit 12 are equipped instead of the reference clock generating circuit 9 and the dot signal generating circuit 10.

The reference clock generating circuit 11 comprises an address counter 111, a line memory 112, a D/A converter 113, a lowpass filter 114 and a VCO 115.

The address counter 111 receives and counts clock pulses having a fixed frequency outputted from a clock generator (not shown), the counting starting when the counter 111 receives a detection signal from the start sensor 8. The counted value is sent to the line memory 112 as an address designating signal.

The line memory 112, which is a one word—n bit memory, stores a value which indicates the main scanning speed V(t) as an n-bit data in an address for each specified incident angle θ. How to store the above value will be described hereinafter.

FIG. 9a shows the relationship between the main scanning speed V(t) and a valid incident angle θ. The valid incident angle θ means an incident angle θ which is required to scan a valid scanning area determined by the f·θ lens 5. FIG. 9a is substantially equivalent with FIG. 2b although the horizontal axis is expressed with the valid incident angle θ in FIG. 9a. In FIG. 9a, the valid incident angle θ is divided into areas by a number of all the addresses (namely, words) in the line memory 112, and a main scanning speed Vi (i=1 ... m) of a left end (for example) of each area is obtained in advance. The value which indicates the main scanning speed Vi of each area is stored in the address bearing the identical number with the area, the value being stored in the form of the n-bit data.

The D/A converter 113 D/A-converts the n-bit digital data which is read out word by word from the line memory 112. The lowpass filter 114 removes a noise from an analog signal from the D/A converter 113, and the VCO 115 outputs a reference clock DC which is in proportion to an output from the lowpass filter 114.

A dot signal generating circuit 12 comprises an image processing section 121, a dot signal generating section 122 and a driver 123 and functions in the same way as the dot signal generating circuit 10 of the first embodiment.

A one-line image is practically scanned as follows from a left end to a right end of the photosensitive material 6.

When the beam spot is detected at the scanning start position by the start sensor 8, the address counter 111 of the reference clock generating circuit 11 is reset and starts counting again in synchronization with the clock pulses having the fixed frequency. The counted value of the address counter 111 is sent to the line memory 112 as an address designating signal, whereby the data stored in the line memory 112 is read out word by word (namely, address by address). The n bits stored in each address of the line memory 112 are all sent to the D/A converter 113 in parallel and converted into analog signals. FIG. 9c shows the analog signals obtained while the laser beam LB scans the photosensitive material 6 once in the main scanning direction.

Each analog signal is converted into a reference clock DC by the VCO 115 and sent to the dot signal generating section 122. The frequency fd(t) of the reference clock DC forms a similar curve to the analog signals of FIG. 9c. If the line memory 112 stores words in a number which is big enough, the curve of the frequency fd(t) is similar to the curve of the main scanning speed V(t), namely, $$fd(t) \propto V(t) \qquad (9)$$

$$fd(t) = K_3 V(t) \qquad (10)$$

($K_3$: constant)

The equation (10) is substantially equivalent with the equation (7) of the first embodiment. Accordingly, the main scanning pitch $\Delta P(t)$ of the beam spot on the photosensitive material 6 can be maintained at a fixed level by use of the reference clock DC having the frequency fd(t) which fulfills the equation (10).

Figure 10:
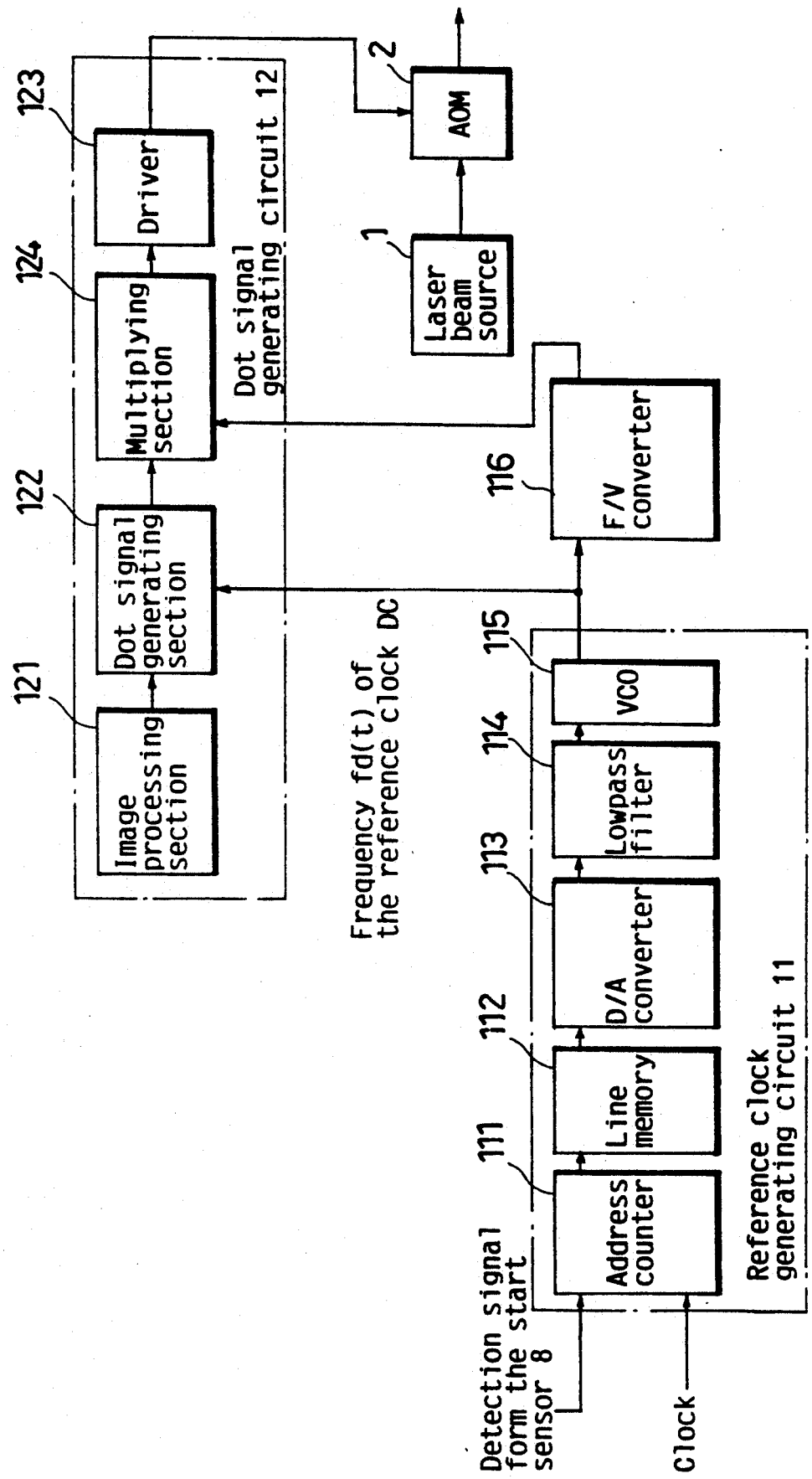
FIG. 10 is a block diagram of a fourth embodiment according to this invention.

FIG. 10 is a block diagram of a fourth embodiment. Although the third embodiment maintains the main scanning pitch $\Delta P(t)$ at a fixed level, the amount of energy irradiated on a unit surface area changes in accordance with the main scanning speed V(t), to make the recording density uneven. The fourth embodiment is devised to overcome the above problem. The dot signal generating circuit 12 is equipped with a multiplying section 124 between the dot signal generating section 122 and the driver 123, and the VCO 115 of the reference clock generating circuit 11 is connected to a frequency/voltage converter 116. A signal from the converter 116 is added to the multiplying section 124.

The above construction is operated in the same way as the second embodiment.

The above embodiments employ the AOM 2 for on/off-modulating the laser beam LB. If a laser diode is used as the laser beam source 1, the laser diode may be driven by a dot signal, in which case, the AOM 2 is not necessary.

Although the present invention has been fully described by way of embodiments with references to the accompanying drawings, it is to be noted that various changes and modifications will be apparent to those skilled in the art. Therefore, unless such changes and modifications depart from the scope of the present invention, they should be construed as being included therein.

What is claimed is:

1. An image recording apparatus for recording an image by scanning a photosensitive material with a laser beam, the image recording apparatus comprising:
    laser beam modulating means for modulating a laser beam based on an image signal and a reference clock;
    first scanning means for scanning a photosensitive material in a main scanning direction with the laser beam modulated by said laser beam modulating means;
    second scanning means for moving the photosensitive material in a sub scanning direction perpendicular to the main scanning direction;
    an f·θ lens for focusing the laser beam to form a beam spot on a surface of the photosensitive material; and
    frequency controlling means for controlling a frequency of the reference clock in proportion to a main scanning speed of the beam spot, the main scanning speed being changed during each scanning due to a characteristic of said f·θ lens.

2. An image recording apparatus of claim 1, wherein said frequency controlling means comprises:
    a line memory for storing a relationship between an incident angle of the laser beam on said f·θ lens and an image height as a bit data concerning at least a valid scanning area, the line memory having a bit per address;
    address designating means for designating the addresses serially at a fixed speed so that the data stored in the line memory can be read out address by address serially from a starting point to a finishing point of the valid scanning area; and
    waveform shaping means for shaping the data from the line memory into a clock pulse.

3. An image recording apparatus of claim 2, wherein said frequency controlling means further comprises a multiplying means for multiplying the clock pulse by a specified number.

4. An image recording apparatus of claim 3, further comprising:
    detecting means for detecting a scanning start position of the laser beam; and
    resetting means for resetting and controlling the address designating means to designate the addresses when the detecting means detects the scanning start position.

5. An image recording apparatus of claim 4, wherein said laser beam modulating means modulates the laser beam generated by a laser beam source and comprises:
    a dot signal generator for converting the image signal into a dot signal by use of the reference clock;
    a driver for amplitude-modulating the dot signal by use of a carrier wave having a high frequency; and
    an acoustic-optical modulator for on/off-modulating the laser beam by use of an output of the driver.

6. An image recording apparatus of claim 4, wherein said laser modulating means includes a laser beam source for generating the laser beam.

7. An image recording apparatus of claim 4, wherein said first scanning means is a polygon mirror.

8. An image recording apparatus of claim 7, further comprising:
    light intensity signal generating means for generating a light intensity signal which is in proportion to the frequency of the reference clock; and
    intensity modulating means for modulating the dot signal by use of the light intensity signal, the dot signal being at a position corresponding to the reference clock in the main scanning direction.

9. An image recording apparatus of claim 8, wherein the light intensity signal generating means is a frequency/voltage converter for converting the frequency of the reference clock into an analog signal indicating a voltage corresponding to the frequency of the reference clock, and the intensity modulating means is a multiplier for multiplying the analog signal by the dot signal, the multiplier being provided between the dot signal generator and the driver.

10. An image recording apparatus of claim 1, wherein said frequency controlling means comprises:
- a line memory for storing a value which indicates the main scanning speed on an image focusing plane of said f·θ lens as an n-bit data, the line memory having one address per n-bit data for each specified incident angle;
- an address counter for designating the addresses serially at a fixed speed so that the data stored in the line memory can be read out address by address serially from a starting point to a finishing point of the valid scanning area; and
- a reference clock generating circuit for generating the reference clock having a frequency which is in proportion to the n-bit data from the line memory.

11. An image recording apparatus of claim 10, wherein the reference clock generating circuit comprises:
- a D/A converter for converting the n-bit data into an analog signal; and
- a voltage-controlled oscillator for converting the analog signal into the reference clock having the frequency which is in proportion to the analog signal.

12. An image recording apparatus of claim 10, further comprising:
- detecting means for detecting a scanning start position of the laser beam; and
- resetting means for resetting and controlling the address counter to designate the addresses when the detecting means detects the scanning start position.

13. An image recording apparatus of claim 12, wherein said laser beam modulating means modulates the laser beam generated by a laser beam source and comprises:
- a dot signal generator for converting the image signal into a dot signal by use of the reference clock;
- a driver for amplitude-modulating the dot signal by use of a carrier wave having a high frequency; and
- an acoustic-optical modulator for on/off-modulating the laser beam by use of an output of the driver.

14. An image recording apparatus of claim 12, wherein said laser beam modulating means includes a laser beam source for generating a laser beam.

15. An image recording apparatus of claim 12, wherein said first scanning means is a polygon mirror.

16. An image recording apparatus of claim 15, further comprising:
- light intensity signal generating means for generating a light intensity signal which is in proportion to the frequency of the reference clock; and
- intensity modulating means for modulating the dot signal by use of the light intensity signal, the dot signal being at a position corresponding to the reference clock in the main scanning direction.

17. An image recording apparatus of claim 16, wherein the light intensity signal generating means is a frequency/voltage converter for converting the frequency of the reference clock into an analog signal indicating a voltage corresponding to the frequency of the reference clock, and the intensity modulating means is a multiplier for multiplying the analog signal by the dot signal, the multiplier being provided between the dot signal generator and the driver.

18. An image recording apparatus for recording an image by scanning a photosensitive material with a laser beam, the image recording apparatus comprising:
- a laser beam source;
- laser beam modulating means for modulating a laser beam generated by said laser beam source based on an image signal and a reference clock;
- first scanning means for scanning a photosensitive material in a main scanning direction with the laser beam modulated by said laser beam modulating means;
- second scanning means for moving the photosensitive material in a sub scanning direction perpendicular to the main scanning direction;
- an f·θ lens for focusing the laser beam to form a beam spot on a surface of the photosensitive material;
- detecting means for detecting a scanning start position of the laser beam; and
- frequency controlling means comprising a line memory for storing a relationship between an incident angle of the laser beam on said f·θ lens and an image height as a bit data concerning at least a valid scanning area, the line memory having a bit per address; an address counter for designating the addresses serially at a fixed speed so that the data stored in the line memory can be read out address by address serially from a starting point to a finishing point of the valid scanning area; and a frequency multiplying circuit for multiplying the data from the line memory by a specified number and for outputting the above-multiplied data as the reference clock.

19. An image recording apparatus of claim 18, wherein said first scanning means is a polygon mirror, and said laser beam modulating means comprises:
- a dot signal generator for converting the image signal into a dot signal by use of the reference clock;
- a driver for amplitude-modulating the dot signal by use of a carrier wave having a high frequency; and
- an acoustic-optical modulator for on/off-modulating the laser beam by use of an output of the driver.

20. An image recording apparatus of claim 19, further comprising:
- analog signal generating means for generating an analog signal indicating a voltage in proportion to the frequency of the reference clock; and
- multiplying means for multiplying the analog signal by the dot signal at a position corresponding to the reference clock in the main scanning direction;
- wherein an intensity of the laser beam is controlled by use of a signal from the multiplying means.

21. An image recording apparatus for recording an image by scanning a photosensitive material with a laser beam, the image recording apparatus comprising:
- a laser beam source;
- laser beam modulating means for modulating a laser beam generated by said laser beam source based on an image signal and a reference clock;
- first scanning means for scanning a photosensitive material in a main scanning direction with the laser beam modulated by said laser beam modulating means;
- second scanning means for moving the photosensitive material in a sub scanning direction perpendicular to the main scanning direction;
- an f·θ lens for focusing the laser beam to form a beam spot on a surface of the photosensitive material;

detecting means for detecting a scanning start position of the laser beam; and frequency controlling means comprising a line memory for storing a value which indicates the main scanning speed on an image focusing plane of said f·θ lens as an n-bit data, where n is an integer of no less than 2, the line memory having one address per n-bit data for each specified incident angle; an address counter for designating the addresses serially at a fixed speed so that the data stored in the line memory can be read out address by address serially from a starting point to a finishing point of the valid scanning area each time said detecting means detects the scanning start position; a D/A converter for converting the n-bit data from the line memory into an analog signal; and a voltage-controlled oscillator for converting the analog signal into the reference clock having the frequency which is in proportion to the analog signal.

22. An image recording apparatus of claim 21, wherein said first scanning means is a polygon mirror, and said laser beam modulating means comprises:

a dot signal generator for converting the image signal into a dot signal by use of the reference clock;

a driver for amplitude-modulating the dot signal by use of a carrier wave having a high frequency; and an acoustic-optical modulator for on/off-modulating the laser beam generator by said laser beam source by use of an output of the driver.

23. An image recording apparatus of claim 22, further comprising:

analog signal generating means for generating an analog signals indicating a voltage in proportion to the frequency of the reference clock; and multiplying means for multiplying the analog signal by the dot signal at a position corresponding to the reference clock in the main scanning direction;

wherein an intensity of the laser beam is controlled by use of a signal from the multiplying means.

24. An image recording method in an image recording apparatus comprising first scanning means for scanning a photosensitive material in a main scanning direction with a laser beam from a laser beam source, an f·θ lens for focusing the laser beam to form a beam spot on a surface of the photosensitive material, and second scanning means for moving the photosensitive material in a sub scanning direction perpendicular to the main scanning direction, the method comprising:

a first step of controlling a frequency of a reference clock in proportion of a main scanning speed of the beam spot, the main scanning speed being changed during each scanning due to a characteristic of the f·θ lens; and a second step of modulating the laser beam based on an image signal and the reference clock before the photosensitive material is scanned with the laser beam by the first scanning means.

25. An image recording method of claim 24, wherein the first step is a procedure of serially reading out relationships between the f·θ lens and an image height from a line memory as a bit data from a starting point to a finishing point of a valid scanning area at a fixed speed, of then shaping the bit data from the line memory into a clock pulse, and of multiplying the frequency of the reference clock by an integer.

26. An image recording method of claim 24, wherein the first step is a procedure of serially reading out a value indicating the main scanning speed as an n-bit data from a line memory from a starting point to a finishing point of a valid scanning area at a fixed speed, of then generating clock pulses each having a frequency in proportion to the n-bit data, and of connecting the clock pulses in series in an order with which the clock pulses are read out.

* * * * *